US010058994B2

(12) United States Patent
Angold et al.

(10) Patent No.: US 10,058,994 B2
(45) Date of Patent: Aug. 28, 2018

(54) EXOSKELETON AND METHOD OF PROVIDING AN ASSISTIVE TORQUE TO AN ARM OF A WEARER (71) Applicant: Ekso Bionics, Inc., Richmond, CA (US)

(72) Inventors: Russ Angold, American Canyon, CA (US); James Lubin, Oakland, CA (US); Mario Solano, Richmond, CA (US); Chris Paretich, Greenbrae, CA (US); Tom Mastaler, Hercules, CA (US)

(73) Assignee: Ekso Bionics, Inc., Richmond, CA (US)

( * ) Notice: Subject to any disclaimer, the term of this patent is extended or adjusted under 35 U.S.C. 154(b) by 0 days.

(21) Appl. No.: 15/385,336

(22) Filed: Dec. 20, 2016

(65) Prior Publication Data
US 2017/0173783 A1  Jun. 22, 2017

Related U.S. Application Data (60) Provisional application No. 62/270,996, filed on Dec. 22, 2015.

(51) Int. Cl.
*G05B 15/00* (2006.01)
*G05B 19/00* (2006.01)
(Continued)

(52) U.S. Cl.
CPC ............. *B25J 9/0006* (2013.01); *B25J 9/106* (2013.01); *B25J 9/109* (2013.01); *B25J 9/14* (2013.01); *Y10S 901/02* (2013.01)

(58) Field of Classification Search
CPC . B25J 9/0006; B25J 9/106; B25J 9/109; B25J 9/14; Y10S 901/02
(Continued)

(56) References Cited

U.S. PATENT DOCUMENTS 3,358,678 A    12/1967  Kultsar
3,449,769 A     6/1969  Mizen
(Continued)

FOREIGN PATENT DOCUMENTS

DE    19940603      4/2001
FR    2917323      12/2008
(Continued)

OTHER PUBLICATIONS

Designs on Earth, Design Museum Awards Nominee 2013: 3D Printed Exoskeleton, http://www.designsonearth.com/design-museum-awards-nominee-20133d-printed-exoskeleton/.
(Continued)

*Primary Examiner* — Harry Y Oh
(74) *Attorney, Agent, or Firm* — Diedericks & Whitelaw, PLC (57) ABSTRACT

An exoskeleton includes a first link that pivots in a transverse plane about a first vertical axis and a second link that pivots in a transverse plane about a second vertical axis. The second link is coupled to the first link. An arm support assembly is coupled to the second link and pivots about a horizontal axis. The arm support assembly includes a spring that generates an assistive torque that counteracts gravity. The arm support assembly provides the assistive torque to an arm of a wearer to support the arm of the wearer. The arm support assembly further includes a cam profile and a cam follower. Contact between the spring, cam follower and cam profile determines an amount of the assistive force provided by the arm support assembly. A cuff is coupled to the arm support assembly and the arm of the wearer.

19 Claims, 8 Drawing Sheets (51) Int. Cl.
  *B25J 9/00* (2006.01)
  *B25J 9/14* (2006.01)
  *B25J 9/10* (2006.01)
(58) Field of Classification Search
  USPC .......................................................... 700/261
  See application file for complete search history.

(56) References Cited

U.S. PATENT DOCUMENTS

| | | | |
|---|---|---|---|
| 4,180,870 | A | 1/1980 | Radulovic et al. |
| 4,298,149 | A | 11/1981 | Gottschalk et al. |
| 4,669,451 | A | 6/1987 | Blauth et al. |
| 4,836,195 | A | 6/1989 | Berrehail |
| 4,896,660 | A | 1/1990 | Scott |
| 5,282,460 | A | 2/1994 | Boldt |
| 5,385,536 | A | 1/1995 | Burkhead et al. |
| 5,407,420 | A | 4/1995 | Bastyr et al. |
| 6,113,562 | A | 9/2000 | Bonutti et al. |
| 6,301,526 | B1* | 10/2001 | Kim ........................ B25J 9/0006 600/1 |
| 6,599,263 | B1 | 7/2003 | Bonutti et al. |
| 6,685,662 | B1 | 2/2004 | Curry et al. |
| 6,929,616 | B2 | 8/2005 | Bonutti et al. |
| 7,410,338 | B2 | 8/2008 | Schiele et al. |
| 7,413,554 | B2 | 8/2008 | Kobayashi et al. |
| 7,862,524 | B2 | 1/2011 | Carignan et al. |
| 7,947,004 | B2 | 5/2011 | Kazerooni et al. |
| 7,955,285 | B2 | 6/2011 | Bonutti et al. |
| 8,152,699 | B1* | 4/2012 | Ma ........................ A61H 1/0229 482/54 |
| 8,273,043 | B2 | 9/2012 | Bonutti et al. |
| 8,409,118 | B2 | 4/2013 | Agrawal et al. |
| 8,425,436 | B2 | 4/2013 | Sankai et al. |
| 8,460,222 | B2 | 6/2013 | Garrec |
| 8,591,442 | B2 | 11/2013 | Bonutti et al. |
| 8,641,782 | B2* | 2/2014 | Kim ........................ B25J 9/0006 414/5 |
| 8,968,222 | B2 | 3/2015 | Kazerooni et al. |
| 9,144,528 | B2 | 9/2015 | Agrawal et al. |
| 9,204,730 | B2 | 12/2015 | Brown |
| 9,205,017 | B2 | 12/2015 | Doyle |
| 9,345,606 | B2 | 5/2016 | Bonutti et al. |
| 9,358,173 | B2 | 6/2016 | Fu et al. |
| 9,375,325 | B2 | 6/2016 | Garret et al. |
| 9,404,618 | B2 | 8/2016 | Brown et al. |
| 9,427,865 | B2* | 8/2016 | Doyle .................... B25J 9/0006 |
| 2003/0115954 | A1 | 6/2003 | Zemlyakov et al. |
| 2007/0060445 | A1* | 3/2007 | Reinkensmeyer ... A61H 1/0274 482/1 |
| 2007/0225620 | A1* | 9/2007 | Carignan ............. A61H 1/0281 601/5 |
| 2010/0204804 | A1* | 8/2010 | Garrec ................. A61H 1/0277 623/24 |
| 2010/0217163 | A1* | 8/2010 | Sankai ................... B25J 9/0006 601/5 |
| 2011/0127390 | A1* | 6/2011 | Brown ..................... A47C 1/03 248/118 |
| 2012/0010749 | A1* | 1/2012 | van der Merwe ........ A61F 2/54 700/264 |
| 2012/0172769 | A1 | 7/2012 | Garrec |
| 2012/0179075 | A1 | 7/2012 | Perry et al. |
| 2012/0184880 | A1* | 7/2012 | Doyle .................. A61H 1/0281 601/33 |
| 2014/0033391 | A1* | 2/2014 | Doyle .................. A61F 5/0118 2/16 |
| 2014/0158839 | A1* | 6/2014 | Doyle .................... A61B 90/60 248/118 |
| 2015/0048134 | A1 | 2/2015 | Fawcett et al. |
| 2015/0076196 | A1 | 3/2015 | Brown et al. |
| 2015/0217444 | A1 | 8/2015 | Asada et al. |
| 2015/0316204 | A1 | 11/2015 | Doyle |
| 2016/0081871 | A1 | 3/2016 | Doyle |
| 2016/0206497 | A1 | 7/2016 | Deshpande et al. |

FOREIGN PATENT DOCUMENTS

| | | |
|---|---|---|
| KR | 20150003562 | 1/2015 |
| WO | WO 1995/32842 | 12/1995 |
| WO | WO 2008/031023 | 3/2008 |

OTHER PUBLICATIONS

Equipois Defy Gravity, X-Ar™ Arm Support, http://www.equipoisinc.com/products/xAr/.
Equipois Defy Gravity, ZeroG, http://www.equipoisinc.com/products/zerog4/.
Magic Arm™, https://magicarms.org.
Wieldy Exoskeleton Dual Arm Vest Camera Video Steadicam, Beijing Wieldy Camera Equipment Sales Co., Ltd., 2009. http://wieldy.en.alibaba.com/product/60229789486-220221396/Wieldy_Exoskeleton_dual_arm_vest_camera_video_steadicam_html.
YouTube, 3D-Printed "Magic Arms", https://youtu.be/WoZ2BgPVtA0.

* cited by examiner

EXOSKELETON AND METHOD OF PROVIDING AN ASSISTIVE TORQUE TO AN ARM OF A WEARER

CROSS REFERENCE TO RELATED APPLICATIONS

This application claims the benefit of U.S. Provisional Patent Application Ser. No. 62/270,996, which was filed on Dec. 22, 2015 and titled "Human Exoskeleton Vest". The entire content of this application is incorporated by reference.

FIELD OF THE INVENTION

The present invention relates to devices that augment a wearer's capacity, stamina, and strength when working with arms outstretched in a static position. The devices also offer the same utility to wearers that are carrying out repeated arm and shoulder movements during the performance of work. The devices increase performance and aid in the prevention of injury during the execution of certain, often repetitive, tasks. More particularly, the present invention relates to wearable devices with arm supports suitable for use by a person engaged in assembly line work or other activities that require the person to use his or her arms to hold tools and perform manual tasks for long periods of time. Such work can involve the person holding tools with his or her arms at locations and angles that increase the person's fatigue. Also, such work can require that the person use tools and keep his or her arms at or above eye level for long periods of time. The devices enhance torso and arm functionality including, but not limited to, greater strength and endurance in the wearer's arms, allowing for longer periods of sustained work activity and improved posture.

BACKGROUND OF THE INVENTION

Wearable exoskeletons have been designed for medical, commercial, and military applications. Medical exoskeletons are generally designed to help restore a patient's mobility. Commercial and military exoskeletons are generally used to reduce loads supported by workers or soldiers during strenuous activities, thereby preventing injuries and augmenting the stamina and strength of these workers or soldiers.

The fatigue and stress on a person's body resulting from doing work that requires the person's arm to reach or hold a static posture are documented in occupational medicine. Holding a static posture places very high static loads on the body, resulting in rapid fatigue. Static postures add to the muscular effort required to do tasks and the lack of motion impedes blood flow. Similarly, the overuse of muscles and tendons in the upper body, including but not limited to the hands, arms, shoulders, back and neck, can result in fatigue and repetitive strain injuries (RSIs). RSIs affect the musculoskeletal and nervous systems. Accordingly, there is a need in the art for an exoskeleton that can reduce or prevent the fatigue and stress caused by such activities, thereby augmenting a wearer's performance and preventing injuries. In particular, there exists a need for an exoskeleton that assists a wearer by directly supporting the weight of the wearer's arms and various tools, increasing the strength and stamina of the wearer during the performance of tasks. There further exists a need to enable a wearer to use tools in ways and for durations of time that would not be possible without an exoskeleton.

SUMMARY OF THE INVENTION

The exoskeletons of the present invention act to improve a wearer's stamina by transferring the weight of the wearer's arms, as well as a tool or load, through the exoskeleton structure, thereby decreasing the weight borne by the wearer. More specifically, an exoskeleton vest provides arm supports that support both the weight of the wearer's physical arms as well as the weight of a tool, reducing user fatigue and providing tool-holding assistance. Weight is transferred from the wearer's hands and arms through the arm supports and vest spine to a hip belt. The wearer guides the arm supports' vertical motion to move the arm supports and any held tools, with the exoskeleton aiding the wearer by supporting the weight of the wearer's arms and the tools. This support is especially beneficial when the wearer is performing work at or above eye level or performing repetitive tasks for prolonged periods of time. The design of the exoskeleton vest structure, and in particular the structure of the arm supports, plays a significant role in the usefulness of the exoskeleton to the wearer in workplace applications.

The exoskeleton vest supports and/or augments the strength of a wearer's arms, allowing the wearer to more easily manipulate and use his or her arms to perform any of a variety of repetitive work tasks without the strain and fatigue that would be present without the exoskeleton vest's support structure. The exoskeleton vest's arm supports follow the wearer's arms and provide an assistive torque that approximately balances the weight of the wearer's arms and any tools held by the wearer. In accordance with one aspect of the invention, the assistive torque goes to zero as the wearer's arms are lowered to the end of travel, thereby enabling the wearer to place the device into a non-assistive mode so that he or she can remove his or her arms from the arm supports without device recoil or other movement. In another aspect, the exoskeleton vest is adjustable for body size and personal ergonomic considerations. This adjustability means that the device's single size fits most people. In an alternative embodiment, rather than being provided as part of an exoskeleton vest, the arm supports are attached to a physical object such as a chair or table. In this type of arrangement, the arm supports still support a person's arms and provide a corresponding efficacy that they offer to a wearer of an exoskeleton vest.

In particular, the present invention is directed to an exoskeleton including a first link configured to pivot in a transverse plane about a first vertical axis and a second link configured to pivot in a transverse plane about a second vertical axis. The second link is coupled to the first link. An arm support assembly is coupled to the second link and is configured to pivot about a horizontal axis. The arm support assembly includes a spring configured to generate an assistive torque that counteracts gravity. The arm support assembly is configured to provide the assistive torque to an arm of a wearer to support the wearer's arm. The arm support assembly further includes a cam profile and a cam follower. The arm support assembly is configured such that contact between the spring, cam follower and cam profile determines an amount of the assistive force provided by the arm support assembly. A cuff is coupled to the arm support assembly and configured to be coupled to the wearer's arm. Specifically, the cuff is configured to be coupled to the wearer's arm between an elbow and a shoulder of the arm.

In one embodiment, the cam profile is configured so that the assistive force provided by the arm support assembly varies depending on a pivotal position of the arm support assembly relative to the horizontal axis. Preferably, the spring is an gas spring.

In another embodiment, the exoskeleton further includes a torso support configured to be coupled to a torso of a wearer and a spinal column configured to transfer the weight of the arm of the wearer to the torso support. The first and second links connect the arm support assembly to the spinal column, thereby allowing the arm support assembly to move relative to the spinal column. The arm support assembly is configured to pivot about the horizontal axis in a sagittal plane, a coronal plane, or a plane intermediate to the sagittal and coronal planes.

In still another embodiment, the exoskeleton further includes a mounting bar, a third link and a detent rail. The mounting bar is directly coupled to the spinal column. The first link includes a first end directly coupled to the mounting bar and a second end directly coupled to a first end of the second link. The second link includes a second end directly coupled to a first end of the third link, and the third link includes a second end directly coupled to the arm support assembly. The detent rail is directly coupled to the arm support assembly and the cuff. The mounting bar is configured to allow the first link to be located at a plurality of different positions relative to the spinal column, thereby enabling the exoskeleton to be adjusted to fit different wearers. The detent rail is configured to allow the cuff to be located at a plurality of different positions relative to the arm support assembly, thereby further enabling the exoskeleton to be adjusted to fit different wearers. The third link is configured to pivot in a transverse plane about a third vertical axis, thereby further allowing the arm support assembly to move relative to the spinal column. The first link pivots relative to the mounting bar about the first vertical axis. The first and second links pivot relative to one another about the second vertical axis. The second and third links pivot relative to one another about the third vertical axis. The third link and the arm support assembly pivot relative to one another about the horizontal axis.

In a still further embodiment, the exoskeleton includes a mounting bar. The arm support assembly, the first link, the second link and the cuff form at least a portion of a support arm. The mounting bar connects the support arm to the spinal column. The mounting bar is configured to allow the support arm to be located at a plurality of different positions relative to the spinal column, thereby enabling the exoskeleton to be adjusted to fit different wearers. The exoskeleton also includes a detent rail. The detent rail connects the cuff to the arm support assembly. The detent rail is configured to allow the cuff to be located at a plurality of different positions relative to the arm support assembly, thereby further enabling the exoskeleton to be adjusted to fit different wearers.

In a preferred embodiment, the arm support assembly, the first link, the second link and the cuff form at least a portion of a support arm. The support arm does not go over a top of a shoulder of the wearer when connected to the spinal column. Also, the exoskeleton does not include an electronic control system configured to control an amount of assistive force provided by the arm support assembly. The exoskeleton does not include a sensor configured to sense a pivotal position of the arm support assembly relative to the horizontal axis. The exoskeleton does not include a powered electric, hydraulic or pneumatic actuator configured to generate the assistive torque. Additionally, relative to the spinal column, the first and second links only move in the transverse plane.

Additional objects, features and advantages of the invention will become more readily apparent from the following detailed description of the invention when taken in conjunction with the drawings wherein like reference numerals refer to corresponding parts in the several views.

DETAILED DESCRIPTION OF THE PREFERRED EMBODIMENTS

Detailed embodiments of the present invention are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific structural and functional details disclosed herein are not to be interpreted as limiting, but merely as a representative basis for teaching one skilled in the art to employ the present invention.

Figure 1A:
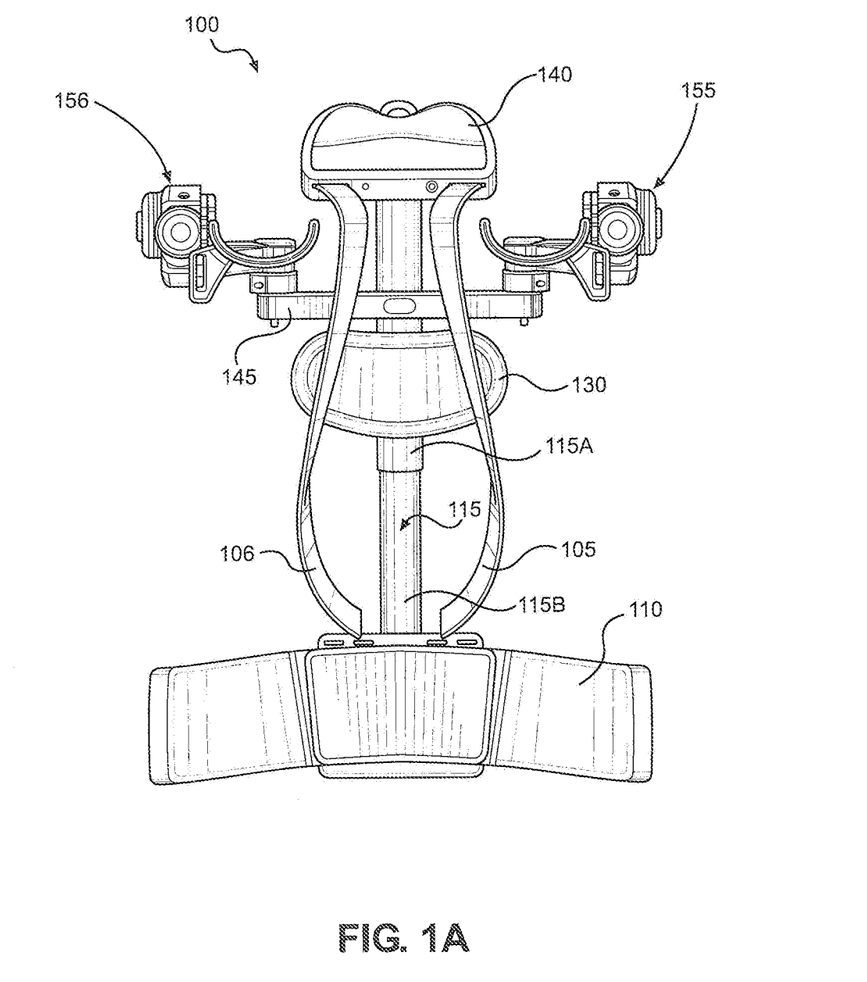
FIG. 1A is a front view of an exoskeleton in accordance with the present invention.
Figure 1B:
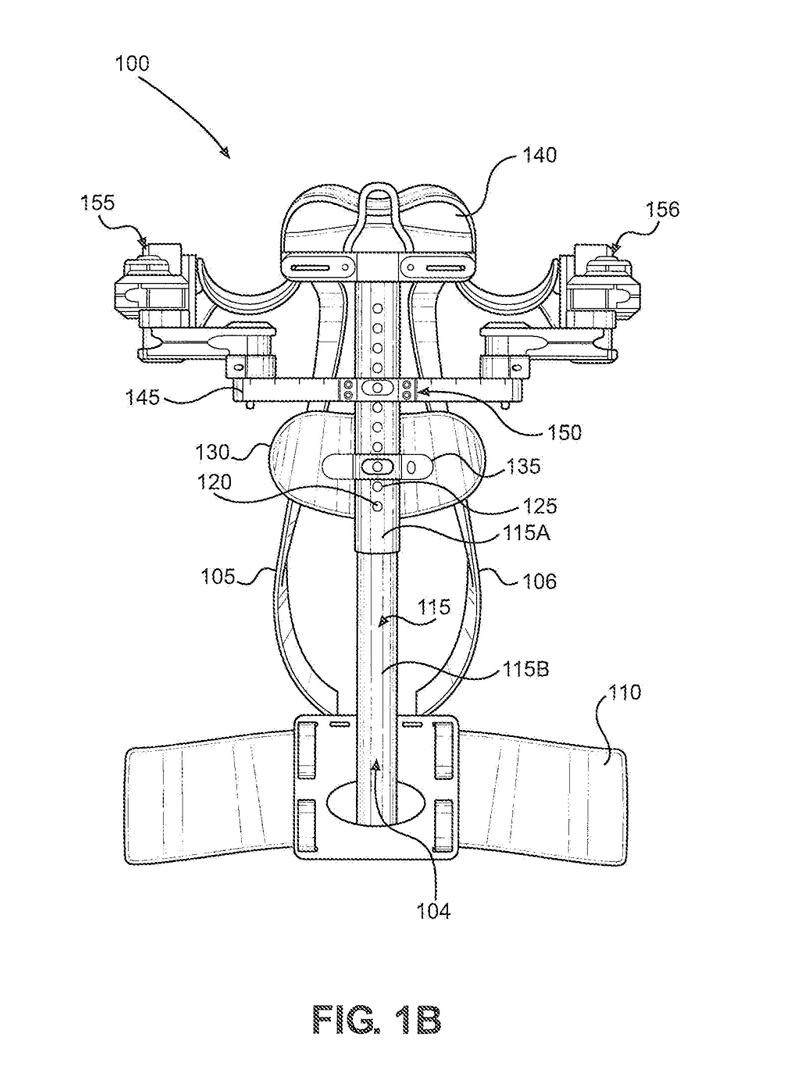
FIG. 1B is a rear view of the exoskeleton.

With initial reference to FIGS. 1A and 1B, there is shown an exoskeleton 100 in accordance with the present invention. Figure 1A provides a front view of exoskeleton 100, while FIG. 1B provides a rear view. In the embodiment shown, exoskeleton 100 takes the form of a vest, which is wearable by a person and enables the wearer to perform work while his or her arms are fully supported by exoskeleton 100. Among other components, exoskeleton 100 includes first and second shoulder straps 105 and 106 through which the wearer puts her or her arms to don exoskeleton 100. A torso support is configured to be securely coupled to the wearer's torso. In the embodiment shown, the torso support takes the form of a belt 110 that is configured to be securely coupled to the wearer at his or her waist. Exoskeleton 100 is supported by a spinal column 115 that acts as a spine for exoskeleton 100, transferring the weight of a load from the upper portions of exoskeleton 100 to hip belt 110. The weight can then be transferred to a support surface either via the wearer's legs or some further portion of exoskeleton 100, e.g., leg supports. Spinal column 115 includes telescoping upper and lower spinal members 115A and 115B such that the length of spinal column 115 is adjustable through the use of a spring-detent button 120 and corresponding holes (one of which is labeled 125). A back pad plate and pad 130 are coupled to spinal column 115, particularly spinal member 115A, and held in place by a split clamp and bolt assembly 135. A headrest 140 is coupled to the top of spinal member 115A of spinal column 115.

Headrest 140 is configured to provide ergonomic support to the wearer's neck and head, especially when the wearer is performing work that requires his or her arms to be at or above his or her head. In another embodiment, to accommodate a wearer wearing a hardhat or work helmet, headrest 140 is replaced with a neck roll attached to shoulder straps 105 and 106 that provides the ergonomic support to the wearer's neck and head. A mounting bar 145 is also coupled to spinal member 115A of spinal column 115. Mounting bar 145 is held in place by a split clamp and four bolts (collectively labeled 150), which enables mounting bar 145 to be adjusted relative to spinal column 115 and therefore also the wearer's shoulder axis. This adjustability ensures a proper fit for the wearer by matching the wearer's shoulder flexion to the pivot points of arm supports 155 and 156. Although certain specific structure has been set forth as being used to provide the coupling or adjustability of certain portions of exoskeleton 100, it should be recognized that there are a variety of connection arrangements known in the art for accomplishing such goals.

Figure 2:
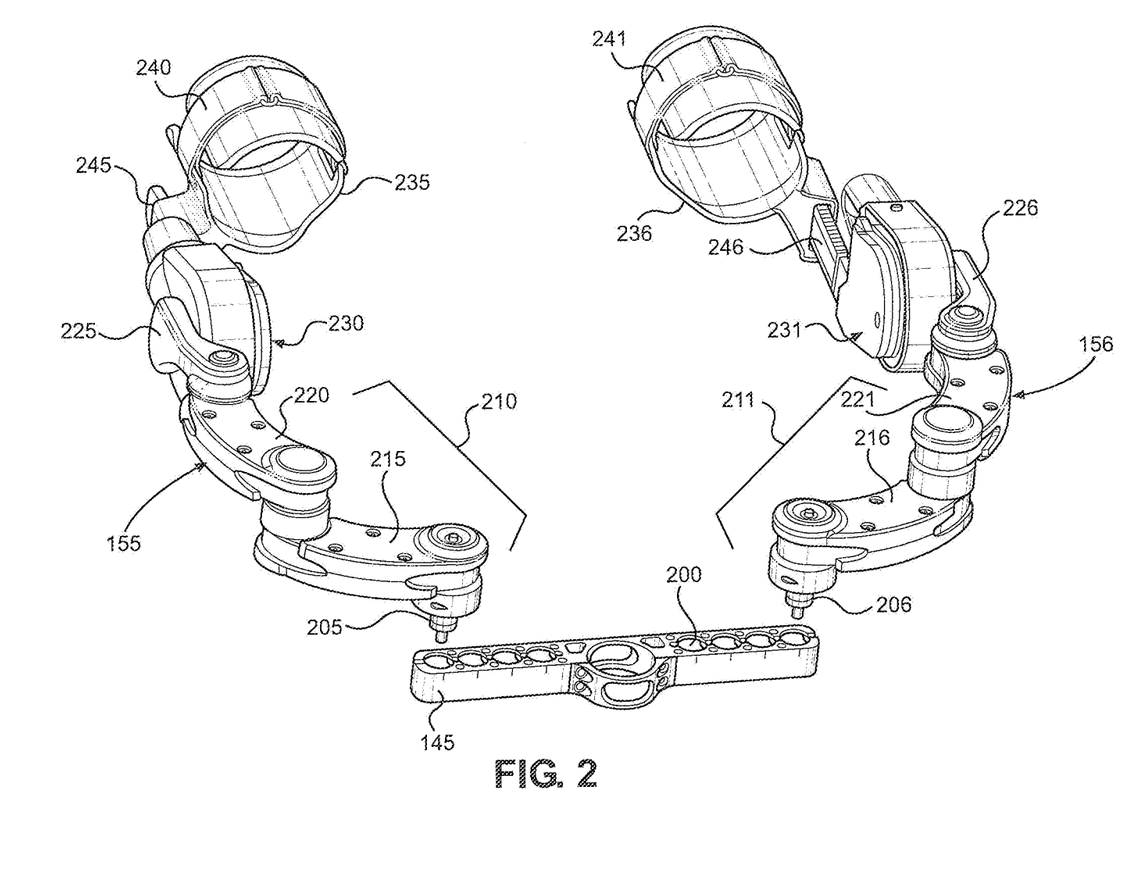
FIG. 2 is a perspective view of a mounting bar and arm supports of the exoskeleton.

With reference now to FIG. 2, mounting bar 145 and arm supports 155 and 156 are shown separated from the rest of exoskeleton 100. Arm supports 155 and 156 are removably coupled to mounting bar 145 so that arm supports 155 and 156 can be secured in sockets (one of which is labeled 200) at different distances from spinal column 115 (not shown in FIG. 2), thereby allowing exoskeleton 100 to be adjusted for different wearers. Specifically, arm supports 155 and 156 include tapered connectors 205 and 206 that fit into selected sockets 200 and are locked in place by fast pins (not visible). In one preferred embodiment, mounting bar 145 has a total of eight sockets 200, with four on each side of spinal column 115. This has been found to provide sufficient adjustment to accommodate the majority of wearers. However, a greater or lesser number of sockets 200 can be provided in other embodiments. Alternatively, in other embodiments, telescoping tubes or linear slides can be used in place of the sockets to enable exoskeleton 100 to be adjusted for different wearers.

Figure 6A:
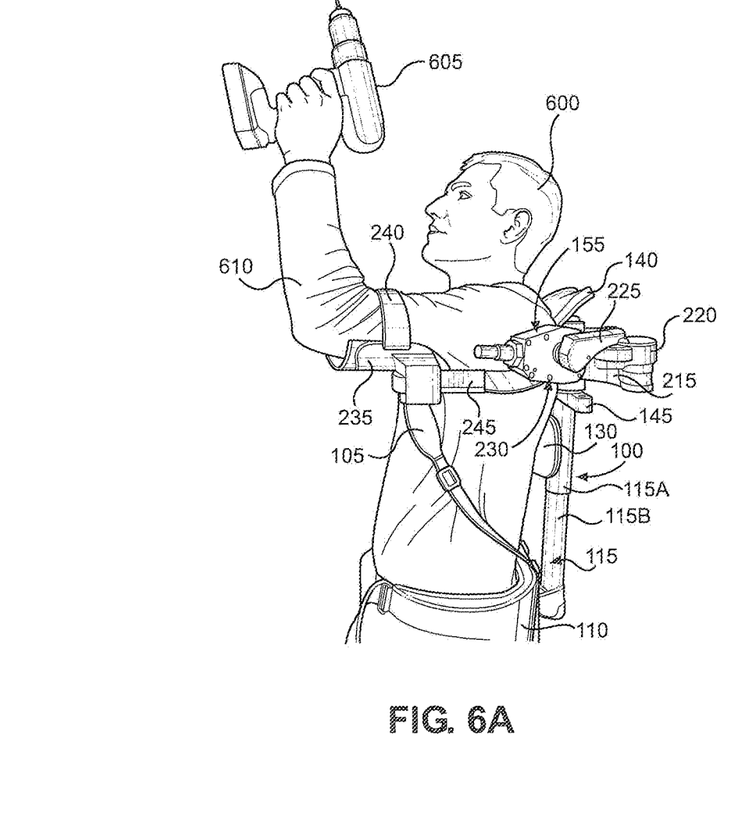
FIG. 6A is a perspective view of the exoskeleton and a wearer.
Figure 6B:
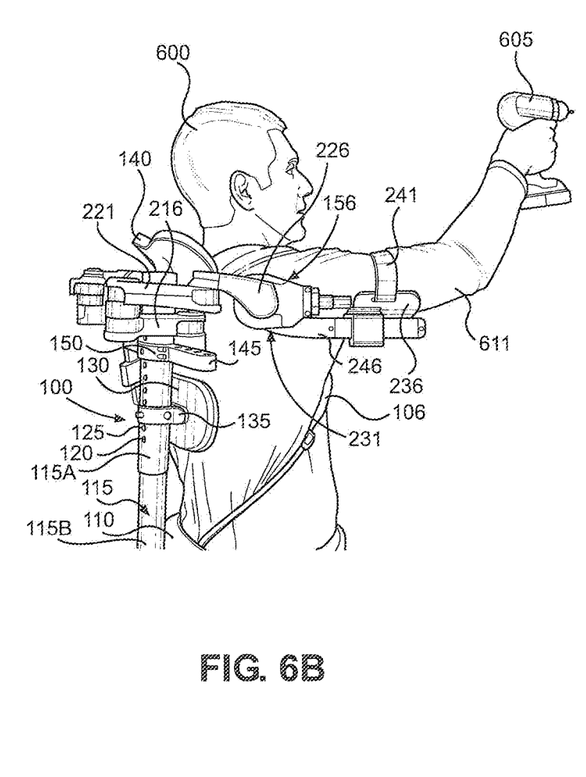
FIG. 6B is another perspective view of the exoskeleton and wearer.

Arm supports 155 and 156 include respective shoulder link assemblies 210 and 211, each of which includes two links. Specifically, shoulder link assembly 210 of arm support 155 includes a first link 215 and a second link 220, while shoulder link assembly 211 of arm support 156 includes a first link 216 and a second link 221. Each links 215, 216, 220 and 221 includes two pivot axes, one at each end. This design provides support for the wearer's arms and additional degrees of arm motion, resulting in ample freedom of movement for the wearer. In addition, the design enables each arm support 155, 156 to self-align during normal activities. Utilizing a chain of two links per shoulder link assembly 210, 211 provides kinematic redundancy. This kinematic redundancy is an important feature of the present invention. Devices known in the art generally attempt to provide a shoulder joint that is kinematically aligned with the shoulder joint of the wearer. However, this is very difficult because the human shoulder is a three-degree-of-freedom ball-and-socket. Furthermore, the human shoulder is coupled to the scapula, which translates in at least two more degrees of freedom with respect to the human spine. As a result, devices known in the art that attempt to mimic this complex motion tend to be large and unwieldy. The double link of shoulder link assemblies 210 and 211, though kinematically under-defined, allows exoskeleton 100 to self-align to the position of the wearer's shoulder without matching the complex human shoulder geometry. While it is generally taught in the art that under-defining a kinematic chain is poor practice, it is effective here because the spring assistance (discussed below) provided by exoskeleton 100 acts orthogonal to the pivot axes of shoulder link assemblies 210 and 211 and therefore does not cause unwanted motion in shoulder link assemblies 210 and 211. Further, much of exoskeleton 100 is located behind the wearer and his or her arms and shoulders, which leaves the wearer's workspace unimpeded by exoskeleton 100. Similarly, the space immediately above the wearer's shoulder is left open, reducing interference with the wearer's head and other equipment. Due to the advantages of this design, in preferred embodiments of the present invention, arm supports 155 and 156 do not go over the shoulders of the wearer but instead go around the sides of the wearer's torso, as illustrated in FIGS. 6A and 6B.

Third links 225 and 226 securely couple shoulder link assemblies 210 and 211 to respective arm support assemblies 230 and 231. Each arm support assembly 230 and 231 includes an internal gas spring, a cam, and a cam follower, which are shown in and will be discussed more fully in connection with FIGS. 4A and 4B. Each arm support assembly 230 and 231 generates a support profile that approximately counteracts the force of gravity, providing the greatest support at horizontal arm locations with the support gradually diminishing as the wearer moves his or her arm vertically downward. Of course, it is desirable in certain embodiments to provide support profiles that do not exactly match gravity to assist with particular tasks. For example, if a wearer is holding a tool overhead, but not holding a tool when his or her arm is horizontal, arm support assemblies 230 and 231 can be configured so that the assistance is greatest when the wearer's arm is above horizontal and less when the arm is horizontal or lower. Although not visible in the figures, arm support assemblies 230 and 231 include respective lock-out switches that lock the gas springs in down, or compressed, positions, thereby putting arm supports 155 and 156 into a neutral mode that keeps arm supports 155 and 156 inactive for donning and doffing. It should also be noted that while the use of an gas spring is preferred, other types of springs known in the art, such as metal springs, can be used in connection with the present invention. Typically, exoskeleton 100 is configured to provide between 10 and 25 pounds of support through each of arm supports 155 and 156. However, this amount can be varied depending on the particular task to be completed by the wearer and the tools involved.

Arm cuffs 235 and 236 are coupled to arm support assemblies 230 and 231, respectively, and provide ergonomic support for the wearer's arms. Also, arm cuffs 235 and 236 securely couple the wearer's arms to exoskeleton 100 through the use of adjustable cuff straps 240 and 241. In a preferred embodiment, arm cuffs 235 and 236 are configured to be coupled to the wearer's upper arms, i.e., each of arm cuffs 235 and 236 is configured to be coupled to one of the wearer's arms between the elbow and shoulder of that arm. Each arm support 155 and 156 includes a detent rail 245 and 246, and each arm cuff 235 and 236 has a catch that interacts with the different adjustment points on a corresponding one of detent rails 245 and 246 (as shown in and further discussed in connection with FIG. 5). This allows arm cuffs 235 and 236 to be adjusted for comfort and to suit different arm lengths. In addition, this adjustment provides a convenient way for the wearer to quickly change the amount of assistance provided by exoskeleton 100 since the amount of assistance provided to arm cuffs 235 and 236 by arm support assemblies 230 and 231 changes based on the distance of arm cuffs 235 and 236 from arm support assemblies 230 and 231.

Figure 3:
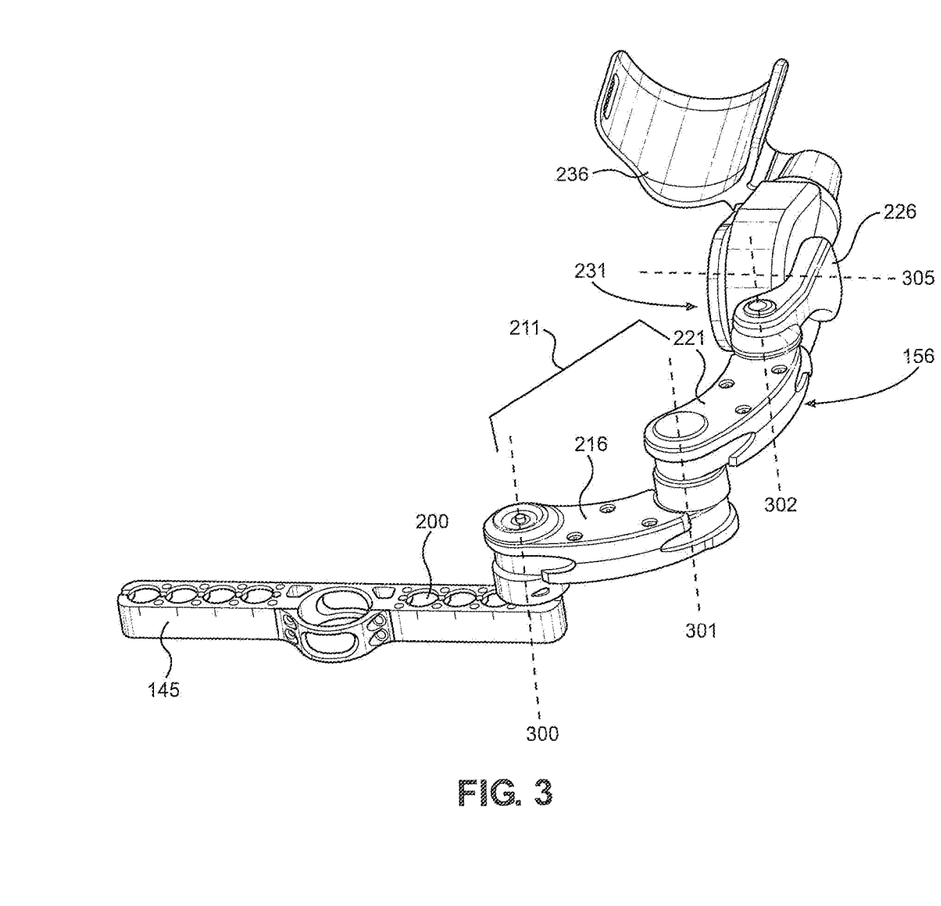
FIG. 3 is a perspective view of the mounting bar and one of the arm supports showing axes of rotation.

Turning to FIG. 3, only arm support 156 and mounting bar 145 are shown. However, the following discussion applies equally to arm support 155. FIG. 3 illustrates the pivot axes of arm support 156, particularly the pivot axes of first link 216, second link 221, third link 226 and arm support assembly 231. This arrangement allows for motion of arm support 156 in the transverse plane about first, second and third vertical axes 300, 301 and 302. Preferably, first link 216, second link 221, and third link 226 move only in the transverse plane (relative to spinal column 115). Motion about axes 300-302 is generally free. However, in some embodiments, motion about axes 300-302 can have light damping or spring loading to prevent unwanted oscillations, although it should be understood that this damping or spring loading is generally small. In addition, arm support assembly 231 rotates orthogonal to the transverse plane about a horizontal axis 305 in the sagittal plane, the coronal plane, or a plane intermediate to the sagittal and coronal planes depending on the orientation of shoulder link assembly 211 and third link 226. Movement about axis 305 is augmented by the support profile generated by arm support assembly 231. Thus, exoskeleton 100 provides assistance to the wearer's arm in the sagittal plane, the coronal plane, or an intermediate plane while not interfering with the motion of the wearer's arm in other directions. Although the terms "vertical" and "horizontal" are used above, it should be recognized that this description assumes that the wearer is standing perfectly upright. It will of course be recognized that, for example, axes 300-302 are not exactly vertical if the wearer is bent at the waist. Additionally, even if the wearer is standing perfectly upright, axes 300-302 and 305 need not be exactly vertical or horizontal. Similarly, arm support 156 need not move in exactly transverse, sagittal or coronal planes (or planes intermediate to the sagittal and coronal planes) when the wearer is standing perfectly upright. Instead, all of these terms are intended to encompass deviations, such as of +/−10 degrees.

Figure 4A:
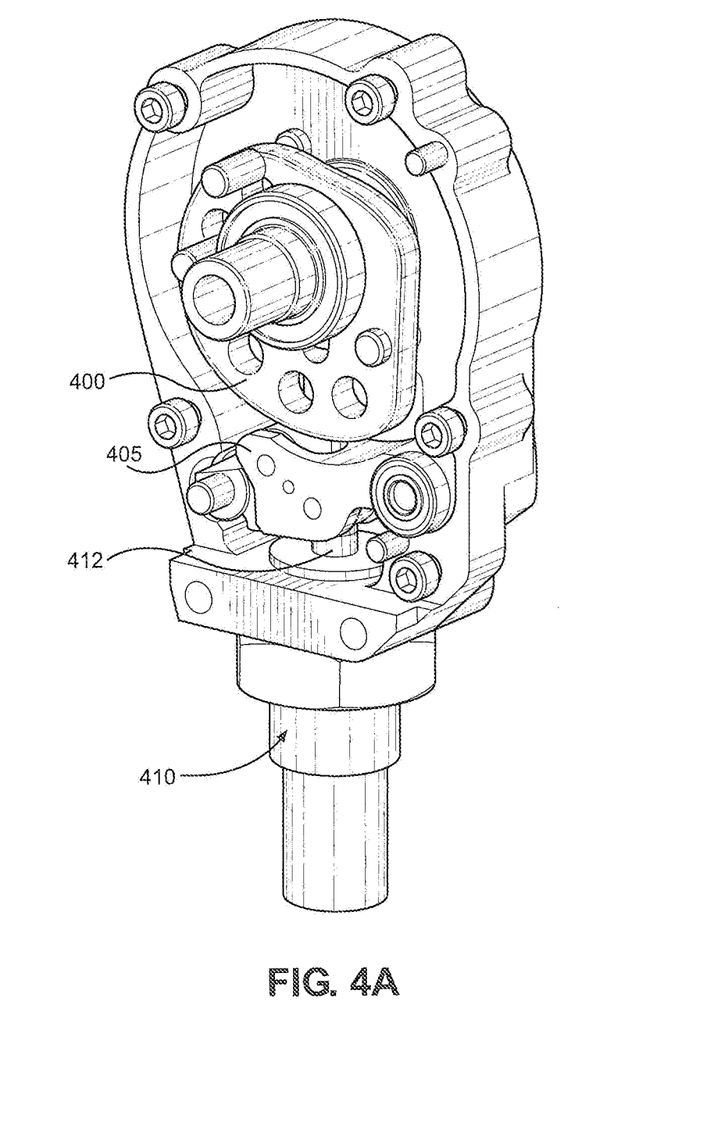
FIG. 4A is a perspective view of a portion of an arm support assembly of the exoskeleton.
Figure 4B:
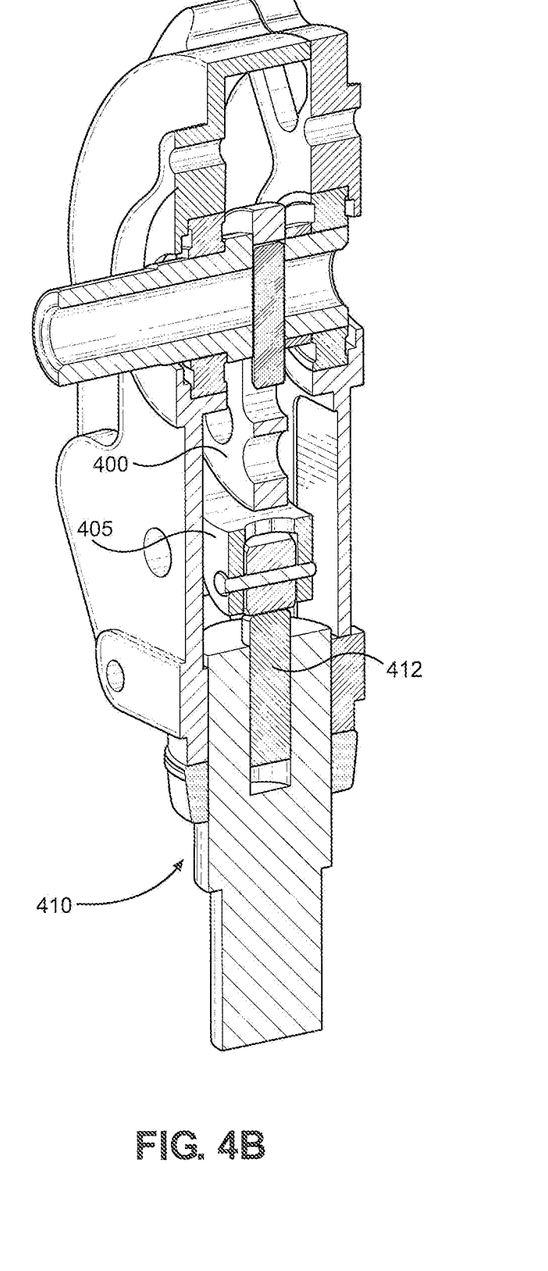
FIG. 4B is a cross section of the portion of the arm support assembly shown in FIG. 4A.

With reference now to FIGS. 4A and 4B, there is shown the interior of one of arm support assemblies 230, 231. As discussed above, each arm support assembly 230 and 231 includes a spring, preferably a gas spring, along with a cam and cam follower. More specifically, as shown in FIGS. 4A and 4B, a cam 400, having a cam profile, interacts with a cam follower 405. Also, a spring, generally indicated at 410, is provided, with the linear force generated by spring 410 causing cam follower 405 to be pressed into contact with cam 400. In particular, a plunger 412 of spring 410 contacts cam follower 405. As a result, rotational motion of cam 400 relative to cam follower 405 is resisted to varying degrees by the action of spring 410. This resistance acts as an assistive force generated by arm support assemblies 230 and 231. In addition, as noted above, the cam profile of cam 400 can be configured to provide different amounts of assistive torque depending on the relative rotational or pivotal position of arm support assemblies 230 and 231 as compared with the rest of arm supports 155 and 156, and more specifically as compared with links 215, 216, 220, 221, 225 and 226. Furthermore, as also noted above, springs other than gas springs can be used in arm support assemblies 230 and 231. The use of springs 410 along with cam 400 and cam follower 405 (although note it is possible to provide for the spring to rest directly against the cam rather than having the interposed cam follower, especially when spring side loading is not a particular concern) advantageously allows exoskeleton 100 to provide assistance to the wearer without the use of electronics, such as sensors or an electronic control system. More specifically, exoskeleton 100 preferably does not include an electronic control system configured to control the amount of assistive force provided by arm support assemblies 230 and 231 or a sensor configured to sense the pivotal positions of arm support assemblies 230 and 231 relative to horizontal axis 305. Accordingly, exoskeleton 100 also does not need a power source, e.g., a battery. In addition, no powered hydraulic, pneumatic, or electric actuators are required. However, even though not preferred, it should be recognized that such features can be incorporated into the present invention if desired.

Figure 5:
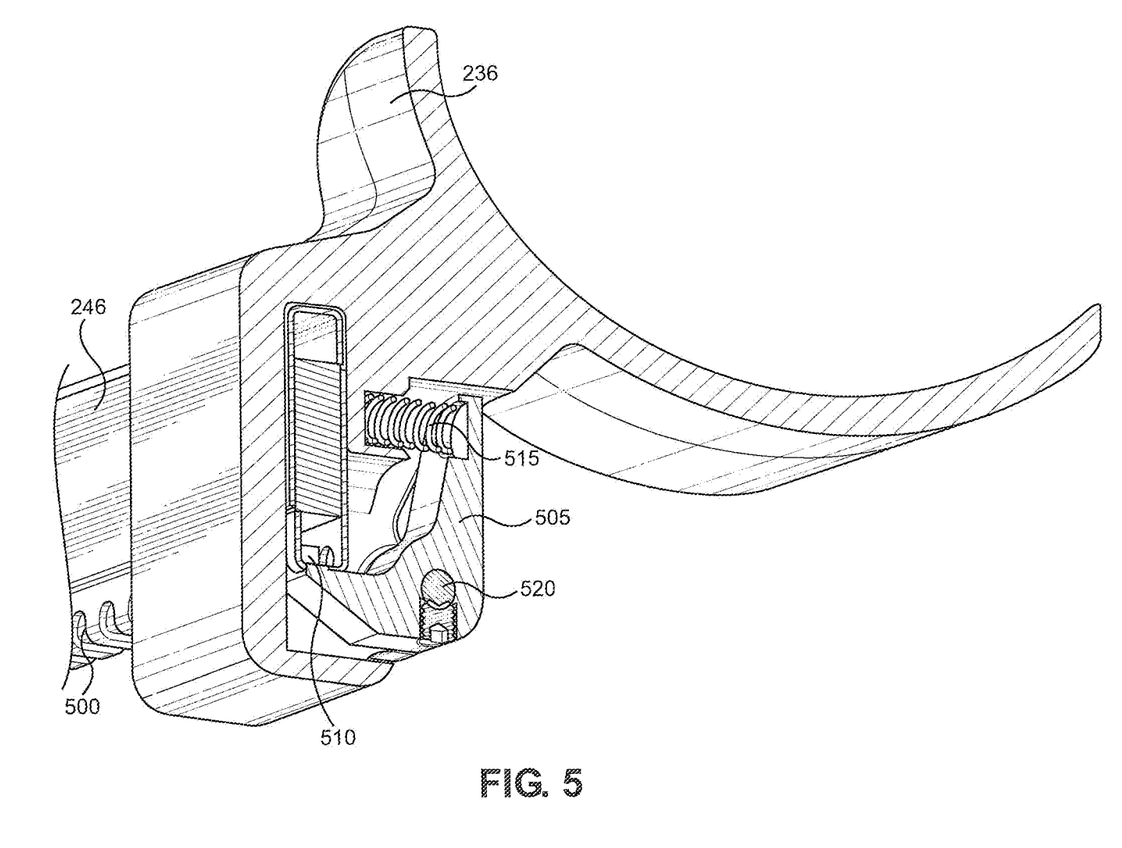
FIG. 5 is a perspective view of a detent rail and arm cuff of the exoskeleton.

Turning to FIG. 5, detent rail 246 and arm cuff 236 of arm support 156 are illustrated. However, the following discussion equally applies to detent rail 245 and arm cuff 235 of arm support 155. Detent rail 246 includes a plurality of notches (one of which is labeled 500), and arm cuff 236 includes a pivotable latch 505 having a catch 510 that can be selectively positioned in one of the notches 500 so that arm cuff 236 can be placed and held at different distances relative to arm support assembly 231. A spring 515 biases latch 505 to a latched position in which catch 510 is maintained in one of the notches 500. When latch 505 is depressed, latch 505 pivots about a catch 520, thereby causing catch 510 to exit its notch 500. At this point, arm cuff 236 can be shifted relative to detent rail 246. After shifting, releasing latch 505 results in catch 510 entering a new notch 500. As discussed above, this allows exoskeleton 100 to be adjusted to fit different wearers and also allows the wearer to adjust the arm of assistance provided by arm support assembly 231. However, as also noted above, other adjustment mechanisms can be used in connection with the present invention. This is true for arm cuffs 235 and 236, as well as the other portions of exoskeleton 100 that are adjustable, e.g., spinal column 115 and arm supports 155 and 156.

FIGS. 6A and 6B show exoskeleton 100 being worn by a wearer 600 during an exemplary work activity. In particular, wearer 600 is holding a tool 605, and exoskeleton 100 provides an assistive torque to arms 610 and 611 of wearer 600 to counteract the force of gravity and thereby support arms 610 and 611 and tool 605. The assistive torque is provided by arm support assemblies 230 and 231, while links 215, 216, 220, 221, 225, and 226 enable wearer 600 to position arms 610 and 611 as desired.

With respect to the assistance or assistive torque provided by arm support assemblies 230 and 231, in addition to varying based on the pivotal position of arm support assemblies 230 and 231, it should be recognized that different amounts of assistance can be provided in different embodiments. For example, in one embodiment, arm support assemblies 230 and 231 can be configured to provide an amount of assistance that renders a typical arm or a typical arm plus a certain tool essentially weightless. Alternatively, arm support assemblies 230 and 231 can be configured to provide some percentage of this amount of assistance, e.g., preferably at least 50%. When an exoskeleton in accordance with the present invention is being designed for a certain task involving a known tool with a given weight, the weight of this tool can be taken into account. However, this is not required. For instance, a more generic exoskeleton can be constructed in accordance with the present invention, with this exoskeleton designed to render the arm of a typical wearer weightless. As a result, if a wearer of such an exoskeleton does make use of a tool, the wearer only needs to support the weight of the tool and not the weight of his or her arms. Similarly, an exoskeleton can be constructed in accordance with the present invention where the exoskeleton is designed to render a 5-pound tool and a typical wearer's arm weightless. In such a case, if a heavier tool is used, the wearer only needs to support the extra weight. Furthermore, the amount of assistance provided by arm support assemblies 230 and 231 does not need to be equal. This can be desirable, for example, in situations where a wearer primarily uses a tool in his or her dominant hand.

Based on the above, it should be readily apparent that the present invention provides an exoskeleton that assists a wearer by directly supporting the weight of the wearer's arms and various tools, thereby increasing the strength and stamina of the wearer and preventing injuries. Although described with reference to preferred embodiments, it should be readily understood that various changes or modifications could be made to the invention without departing from the spirit thereof. For instance, although the exoskeleton 100 is shown as a vest, exoskeletons in accordance with the present invention can take other forms. For example, the arm supports can be coupled to a physical object, such as a table or chair, in the user's workspace. In addition, some wearers of the vest might work in locations where they are required to wear safety harnesses for fall protection. A safety harness has a lanyard ring that is located between the wearer's shoulder blades. In another embodiment, the exoskeleton vest's torso support spine could be reconfigured to be a "Y-shaped" or two-column support spine. Each of these alternative spinal structures would enable a worker to wear a safety harness under the exoskeleton vest and would provide easy access to the harness's lanyard ring. In general, the invention is only intended to be limited by the scope of the following claims.

The invention claimed is:

1. An exoskeleton comprising:
a first link configured to pivot in a transverse plane about a first vertical axis;
a second link coupled to the first link and configured to pivot in a transverse plane about a second vertical axis distinct from the first vertical axis;
an arm support assembly coupled to the second link and configured to pivot about a horizontal axis, wherein:
the arm support assembly is connected to the first link by the second link;
the arm support assembly includes a spring configured to generate an assistive torque that counteracts gravity;
the arm support assembly is configured to provide the assistive torque to an arm of a wearer to support the arm of the wearer;
the arm support assembly further includes a cam profile and a cam follower; and
the arm support assembly is configured such that the spring causes the cam follower and cam profile to be pressed into contact and contact between the cam follower and cam profile determines an amount of the assistive force provided by the arm support assembly; and
a cuff coupled to the arm support assembly and configured to be coupled to the arm of the wearer.

2. The exoskeleton of claim 1, wherein the cam profile is configured so that the assistive force provided by the arm support assembly varies depending on a pivotal position of the arm support assembly relative to the horizontal axis.

3. The exoskeleton of claim 1, wherein the spring is a gas spring.

4. The exoskeleton of claim 1, further comprising:
a torso support configured to be coupled to a torso of a wearer; and
a spinal column configured to transfer a weight of the arm of the wearer to the torso support, wherein the first and second links connect the arm support assembly to the spinal column, thereby allowing the arm support assembly to move relative to the spinal column.

5. The exoskeleton of claim 4, further comprising a mounting bar, a third link and a detent rail, wherein:
the mounting bar is directly coupled to the spinal column;
the first link includes a first end directly coupled to the mounting bar and a second end directly coupled to a first end of the second link;
the second link includes a second end directly coupled to a first end of the third link;
the third link includes a second end directly coupled to the arm support assembly;
the detent rail is directly coupled to the arm support assembly and the cuff;
the mounting bar is configured to allow the first link to be located at a plurality of different positions relative to the spinal column, thereby enabling the exoskeleton to be adjusted to fit different wearers;
the detent rail is configured to allow the cuff to be located at a plurality of different positions relative to the arm support assembly, thereby further enabling the exoskeleton to be adjusted to fit different wearers;
the third link is configured to pivot in a transverse plane about a third vertical axis, thereby further allowing the arm support assembly to move relative to the spinal column;
the first link pivots relative to the mounting bar about the first vertical axis;
the first and second links pivot relative to one another about the second vertical axis;
the second and third links pivot relative to one another about the third vertical axis; and
the third link and the arm support assembly pivot relative to one another about the horizontal axis.

6. The exoskeleton of claim 1, wherein the cuff is configured to be coupled to the arm of the wearer between an elbow and a shoulder of the arm.

7. The exoskeleton of claim 4, further comprising a mounting bar, wherein:
the arm support assembly, the first link, the second link and the cuff form at least a portion of a support arm;
the mounting bar connects the support arm to the spinal column; and
the mounting bar is configured to allow the support arm to be located at a plurality of different positions relative to the spinal column, thereby enabling the exoskeleton to be adjusted to fit different wearers.

8. The exoskeleton of claim 7, further comprising a detent rail, wherein:
the detent rail connects the cuff to the arm support assembly; and
the detent rail is configured to allow the cuff to be located at a plurality of different positions relative to the arm support assembly, thereby further enabling the exoskeleton to be adjusted to fit different wearers.

9. The exoskeleton of claim 4, wherein the arm support assembly, the first link, the second link and the cuff form at least a portion of a support arm, and wherein the support arm does not go over a top of a shoulder of the wearer when connected to the spinal column.

10. The exoskeleton of claim 1, wherein the exoskeleton does not include an electronic control system configured to control an amount of assistive force provided by the arm support assembly.

11. The exoskeleton of claim 1, wherein the exoskeleton does not include a sensor configured to sense a pivotal position of the arm support assembly relative to the horizontal axis.

12. The exoskeleton of claim 1, wherein the exoskeleton does not include a powered electric, hydraulic, or pneumatic actuator configured to generate the assistive torque.

13. The exoskeleton of claim 4, wherein, relative to the spinal column, the first and second links only move in the transverse plane.

14. The exoskeleton of claim 4, wherein the arm support assembly is configured to pivot about the horizontal axis in a sagittal plane, a coronal plane, or a plane intermediate to the sagittal and coronal planes.

15. A method of providing an assistive torque to an arm of a wearer with an exoskeleton, the exoskeleton including: a first link configured to pivot in a transverse plane about a first vertical axis; a second link coupled to the first link and configured to pivot in a transverse plane about a second vertical axis distinct from the first vertical axis; an arm support assembly coupled to the second link and configured to pivot about a horizontal axis, wherein the arm support assembly is connected to the first link by the second link, and the arm support assembly includes a spring, a cam profile and a cam follower; and a cuff coupled to the arm support assembly and configured to be coupled to an arm of a wearer, the method comprising:
  generating an assistive torque, counteracting gravity, with the spring;
  providing the assistive torque to the arm of the wearer with the arm support assembly to support at least the arm of the wearer; and
  determining an amount of the assistive force provided by the arm support assembly with the cam profile and cam follower, wherein the arm support assembly is configured such that the spring causes the cam follower and cam profile to be pressed into contact and contact between the cam follower and cam profile determines the amount of the assistive force provided by the arm support assembly.

16. The method of claim 15, further comprising:
  varying the assistive force provided by the arm support assembly depending on a pivotal position of the arm support assembly relative to the horizontal axis.

17. The method of claim 15, wherein the spring of the arm support assembly is a gas spring, and generating the assistive torque includes generating the assistive torque with the gas spring.

18. The method of claim 15, wherein the exoskeleton further comprises:
  a torso support configured to be coupled to a torso of the wearer; and
  a spinal column;
  the method further comprising:
  transferring a weight of the arm of the wearer to the torso support with the spinal column, wherein the first and second links connect the arm support assembly to the spinal column, thereby allowing the arm support assembly to move relative to the spinal column.

19. The method of claim 15, wherein the method does not comprise:
  controlling an amount of assistive force provided by the arm support assembly with an electronic control system;
  sensing a pivotal position of the arm support assembly relative to the horizontal axis with a sensor; or
  generating the assistive torque with a powered electric, hydraulic or pneumatic actuator.

* * * * *